(12) United States Patent
Schultz et al.

(10) Patent No.: US 7,317,182 B2
(45) Date of Patent: Jan. 8, 2008

(54) BACKLIGHT WEDGE WITH ENCAPSULATED LIGHT SOURCE

(75) Inventors: John C. Schultz, Afton, MN (US); Michael A. Meis, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/440,327

(22) Filed: May 24, 2006

(65) Prior Publication Data

US 2007/0272839 A1  Nov. 29, 2007

(51) Int. Cl.
  *G02B 6/00*  (2006.01)
(52) U.S. Cl. .................. 250/227.31; 362/310
(58) Field of Classification Search ........... 250/227.11, 250/227.28, 227.29, 227.31; 385/36, 146; 362/610, 612, 613, 624, 627, 628, 800
See application file for complete search history.

(56) References Cited

U.S. PATENT DOCUMENTS

| | | |
|---|---|---|
| 3,923,381 A | 12/1975 | Winston |
| 4,013,915 A | 3/1977 | Dufft |
| 4,240,692 A | 12/1980 | Winston |
| 4,918,583 A | 4/1990 | Kudo et al. |
| 4,963,933 A | 10/1990 | Brownlee |
| 5,001,609 A | 3/1991 | Gardner et al. |
| 5,050,946 A | 9/1991 | Hathaway et al. |
| 5,055,978 A | 10/1991 | Rogoff |
| 5,059,013 A | 10/1991 | Jain |
| 5,202,950 A | 4/1993 | Arego et al. |
| 5,255,171 A | 10/1993 | Clark |
| 5,296,601 A | 3/1994 | Suto et al. |
| 5,359,691 A | 10/1994 | Tai et al. |
| 5,835,661 A | 11/1998 | Tai et al. |
| 5,854,872 A | 12/1998 | Tai |
| 5,882,774 A | 3/1999 | Jonza et al. |
| 5,926,601 A | 7/1999 | Tai et al. |
| 6,080,467 A | 6/2000 | Weber et al. |
| 6,905,220 B2 | 6/2005 | Wortman et al. |
| 6,924,014 B2 | 8/2005 | Ouderkirk et al. |
| 6,975,370 B2 * | 12/2005 | Yu et al. ............ 349/65 |
| 7,080,932 B2 | 7/2006 | Keuper |
| 2001/0046131 A1 | 11/2001 | Hoelen et al. |
| 2002/0030772 A1 | 3/2002 | Nauta et al. |

(Continued)

FOREIGN PATENT DOCUMENTS

EP   760962   10/2002

(Continued)

*Primary Examiner*—John R. Lee
(74) *Attorney, Agent, or Firm*—Lance L. Vietzke

(57) ABSTRACT

A backlight may include a light guide and a light input. The light guide may have a light reflection surface and a light emission surface. The light input may include a diverging wedge having a narrow end and opposing side surfaces extending to the narrow end. A light source well may be formed in the light input, and a light source may be disposed within the light source well. An encapsulant may be disposed about the light source, within the light source well. A specularly reflective film or layer may be disposed adjacent to but not in intimate contact with the opposing side surfaces and may reflect more than 80% of visible light incident on the multilayer polymeric mirror film.

24 Claims, 4 Drawing Sheets

U.S. PATENT DOCUMENTS

| | | |
|---|---|---|
| 2002/0061178 A1* | 5/2002 | Winston et al. ............. 385/133 |
| 2003/0076034 A1 | 4/2003 | Marshall et al. |
| 2003/0165067 A1 | 9/2003 | Imamura et al. |
| 2004/0042233 A1 | 3/2004 | Suzuki et al. |
| 2004/0062028 A1* | 4/2004 | Winston et al. ............... 362/31 |
| 2004/0114068 A1* | 6/2004 | Yu et al. ....................... 349/65 |
| 2005/0007753 A1 | 1/2005 | Van Hees et al. |
| 2005/0023545 A1 | 2/2005 | Camras et al. |
| 2005/0146894 A1 | 7/2005 | Keuper |
| 2005/0259939 A1 | 11/2005 | Rinko |
| 2006/0002141 A1* | 1/2006 | Ouderkirk et al. .......... 362/609 |
| 2006/0002678 A1 | 1/2006 | Weber et al. |
| 2006/0008205 A1 | 1/2006 | Meir et al. |
| 2006/0104092 A1* | 5/2006 | Feng et al. .................. 362/626 |
| 2006/0132423 A1 | 6/2006 | Travis |
| 2006/0197433 A1* | 9/2006 | Chen .......................... 313/495 |
| 2007/0025680 A1* | 2/2007 | Winston et al. ............. 385/146 |

FOREIGN PATENT DOCUMENTS

| | | |
|---|---|---|
| JP | 200315413 | 1/2003 |
| JP | 2004031064 | 1/2004 |
| JP | 2004247207 | 9/2004 |
| JP | 2006128896 | 5/2006 |
| WO | WO 01/84229 | 11/2001 |
| WO | WO 03/048635 | 6/2003 |
| WO | WO 03/096925 | 11/2003 |

* cited by examiner though not all, numerical values set forth in the specific examples are reported as precisely as possible. Any numerical value, however, inherently contain certain errors necessarily resulting from the standard deviations found in their respective testing measurements.

BACKLIGHT WEDGE WITH ENCAPSULATED LIGHT SOURCE

BACKGROUND

The present disclosure relates generally to optical assemblies such as light source assemblies and backlight assemblies.

Optical devices employing backlights are used, for example, in displays for laptop computers, hand-held calculators, digital watches, cellphones, televisions and similar devices as well as illuminated signs and many other devices.

SUMMARY

In an illustrative but non-limiting example of the disclosure, a backlight is disclosed. A backlight may include a visible light transmissive body primarily propagating light by total internal reflection (TIR), the visible light transmissive body including a light guide portion and a light input portion. The light guide portion may have a light reflection surface and a light emission surface. The light input portion may have non-parallel opposing side surfaces. A light source well that includes a light source well surface may be formed in one of the light input portion surfaces. A light source may extend into the light source well such that the light source emits light into the light input portion. An encapsulant may be disposed between the light source and the light source well surface. A specularly reflective film or layer may be disposed adjacent to but not in intimate contact with the opposing side surfaces and may reflect more than 80% of visible light incident on the specularly reflective film or layer.

In another illustrative but non-limiting example of the disclosure, a backlight is disclosed. The backlight may include a diverging wedge that is defined by a narrow end surface and a wide end surface. Non-parallel opposing side surfaces extend between the narrow end and the wide end. A light source well that includes a light source well surface may be formed in one of the wedge surfaces. A light source may extend into the light source well and emits light into the diverging wedge. An encapsulant is disposed between the light source and the light source well surface. A light guide having a light reflection surface and a light extraction surface may be optically coupled to the wide end surface. A specularly reflective film or layer may be disposed adjacent to but not in intimate contact with the diverging wedge and may reflect more than 80% of visible light incident on the specularly reflective film or layer.

In another illustrative but non-limiting example of the disclosure, a backlight is disclosed. A backlight may include a first diverging wedge that is defined by a first narrow end surface and a first wide end surface. First non-parallel opposing side surfaces extend between the first narrow end and the first wide end. A first light source well that includes a first light source well surface may be formed in one of the first diverging wedge surfaces. A first light source may extend into the first light source well and emits light into the first diverging wedge. A first encapsulant is disposed between the first light source and the first light source well surface.

The backlight assembly may include a second diverging wedge that is defined by a second narrow end surface and a second wide end surface. Second non-parallel opposing side surfaces extend between the second narrow end and the second wide end. A second light source well that includes a second light source well surface may be formed in one of the second diverging wedge surfaces. A second light source may extend into the second light source well and emits light into the second diverging wedge. A second encapsulant is disposed between the second light source and the second light source well surface.

A light guide having a light reflection surface and a light extraction surface may be optically coupled to the first wide end surface and the second wide end surface. A specularly reflective film or layer may be disposed adjacent to but not in intimate contact with the first and second diverging wedges, the specularly reflective film or layer reflecting more than 80% of visible light incident on the specularly reflective film or layer.

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE FIGURES

The disclosure may be more completely understood in consideration of the following detailed description of the accompanying drawings, in which.

DETAILED DESCRIPTION

Figure 1:
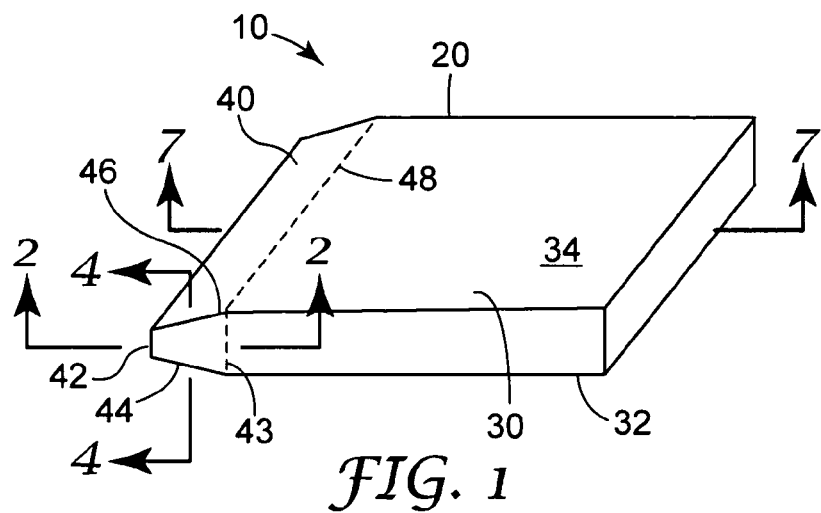
FIG. 1 is a diagrammatic perspective view of an illustrative but non-limiting backlight as described herein.

Accordingly, the present disclosure is directed to backlights having light input wedges with specularly reflective layers separated from the light input wedge by an air gap. While the present invention is not so limited, an appreciation of various aspects of the invention will be gained through a discussion of the examples provided below.

The following description should be read with reference to the drawings, in which like elements in different drawings are numbered in like fashion. The drawings, which are not necessarily to scale, depict selected illustrative embodiments and are not intended to limit the scope of the disclosure. Although examples of construction, dimensions, and materials are illustrated for the various elements, those skilled in the art will recognize that many of the examples provided have suitable alternatives that may be utilized.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. For example, reference to "a layer" encompasses embodiments having one, two or more layers. As used in this specification and the appended claims, the term "or" is generally employed in its sense including "and/or" unless the content clearly dictates otherwise.

The term "polymer" will be understood to include polymers, copolymers (e.g., polymers formed using two or more different monomers), oligomers and combinations thereof, as well as polymers, oligomers, or copolymers that can be formed in a miscible blend.

A specularly reflective surface is a surface for which an incident light ray is reflected such that the reflected angle is equal to the angle of incidence. On a practical basis, all surfaces have some deformation which results in some scattering of the reflected light ray and for the purposes of this discussion, a value of 10% of the light energy may be reflected at angles not equal to the incident angle. In many embodiments, there is less than 1% of the light reflected at angles not equal to the incident angle.

The present disclosure is applicable to illumination assemblies, and is more particularly applicable to illumination assemblies that provide illumination using light sources. The illumination assemblies disclosed herein can be used for general lighting purposes, e.g., to illuminate an area, or for providing information to a viewer by selective illumination of different areas of the assembly as in an information display. Such assemblies are suitable for use in backlight displays, signs, luminaries and other lighting applications that require a significant amount of light.

The light sources described herein can include any suitable light source. In some embodiments, the light source includes one or more discrete light emitting diodes (LED) dies or chips. In some instances, an LED may be a wire bonded LED. Wire bonded LEDs may include a wire that extends from the LED die to a circuit or other power source. In some instances, wire bonded LEDs may be considered to be susceptible to damage, particularly to the wire extending between the LED die and the power source.

As used herein, the terms "LED" and "light emitting diode" refer generally to light emitting semiconductor elements with contact areas for providing power to the diode. A III-V semiconductor light emitting diode may be formed, for example, from a combination of one or more Group III elements and one or more Group V elements. Suitable materials include nitrides, such as gallium nitride or indium gallium nitride, and phosphides, such as indium gallium phosphide. Other types of III-V materials can also be used, as can inorganic materials from other groups of the periodic table.

LEDs can be selected to emit at any desired wavelength, such as in the red, green, blue, cyan, magenta, yellow, ultraviolet, or infrared spectral regions. In an array of LEDs, the LEDs can each emit in the same spectral region, or can emit in different spectral regions. Different LEDs may be used to produce different colors where the color of light emitted from the light emitting element is selectable. Individual control of the different LEDs leads to the ability to control the color of the emitted light. In addition, if white light is desired, then a number of LEDs emitting light of different colors may be provided, whose combined effect is to emit light perceived by a viewer to be white.

Another approach to producing white light is to use one or more LEDs that emit light at a relatively short wavelength and to convert the emitted light to white light using a phosphor wavelength converter. White light is light that stimulates the photoreceptors in the human eye to yield an appearance that an ordinary observer would consider "white." Such white light may be biased to the red (commonly referred to as warm white light) or to the blue (commonly referred to as cool white light). Such light can have a color rendering index of up to 100. In one embodiment, a collection of red, blue, and green LED dies can be selectively placed in an array. The resulting emission of light is seen by an observer as colored light or "white" light, when blended together in concert.

In other embodiments, the solid state radiation sources includes organic light emitting diodes (OLED), vertical cavity surface emitting lasers (VCSEL), laser diodes, and the like.

The light input wedges described herein include a specular reflective layer that is disposed adjacent to but not in intimate contact with at least, the diverging surfaces of the light input wedge. Since the specular reflective layer is not in intimate contact with the light input wedge diverging sides, light moves out of the diverging wedge mostly via direct emission or through total internal reflection (TIR). Light that escapes through the diverging sides of the light input wedge is then reflected via the specular reflective layer. This configuration has been found to improve the efficiency of the light input wedge. The specular reflective layer can be any useful specular reflective layer such as, for example, a metal or dielectric material. Illustrative specular reflective metal layers or films include silvered mirrors, polished metallic or metalized surfaces.

In some instances, the light source devices described herein utilize the unique and advantageous properties of multilayer optical films. The advantages, characteristics and manufacturing of such films are most completely described in U.S. Pat. No. 5,882,774, which is incorporated herein by reference. The multilayer optical film is useful, for example, as highly efficient spectral mirrors. A relatively brief description of the properties and characteristics of the multilayer optical film is presented below followed by a description of illustrative embodiments of backlight systems using the multilayer optical mirror film according to the present disclosure.

Multilayer optical mirror films as used in conjunction with the present invention exhibit relatively low absorption of incident light, as well as high reflectivity for off-axis as well as normal light rays. The unique properties and advantages of the multi-layer optical film provides an opportunity to design highly efficient backlight systems which exhibit low absorption losses when compared to known backlight systems. Exemplary multilayer optical mirror film of the present invention is described in U.S. Pat. No. 6,924,014, which is incorporated herein by reference (see Example 1 and Example 2).

Exemplary multilayer optical mirror film includes a multilayer stack having alternating layers of at least two materials. At least one of the materials has the property of stress induced birefringence, such that the index of refraction (n) of the material is affected by the stretching process. The difference in refractive index at each boundary between layers will cause part of ray to be reflected. By stretching the multilayer stack over a range of uniaxial to biaxial orientation, a film is created with a range of reflectivities for differently oriented plane-polarized incident light. The multilayer stack can thus be made useful as a mirror. Multilayer optical films constructed accordingly exhibit a Brewster angle (the angle at which reflectance goes to zero for light incident at any of the layer interfaces) which is very large or is nonexistent. As a result, these polymeric multilayer stacks having high reflectivity for both s and p polarized light over a wide bandwidth, and over a wide range of angles, reflection can be achieved.

The multilayer polymeric mirror film can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials. The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers. In many embodiments, the multilayer polymeric mirror film includes low/high index pairs of film layers, wherein each low/high index pair of layers has a combined optical thickness of ½ the center wavelength of the band it is designed to reflect.

For multilayer polymeric mirror films, the desired average transmission for light of each polarization and plane of incidence generally depends upon the intended use of the reflective mirror film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400-700 nm) is desirably less than 10% (reflectance greater than 90%), or less than 5% (reflectance greater than 95%), or less than 2% (reflectance greater than 98%), or less than 1% (reflectance greater than 99%). The average transmission at 60 degrees from the normal from 400-700 nm is desirably less than 20% (reflectance greater than 80%), or less than 10% (reflectance greater than 90%), or less than 5% (reflectance greater than 95%), or less than 2% (reflectance greater than 98%), or less than 1% (reflectance greater than 99%).

With the design considerations described in the above mentioned U.S. Pat. No. 5,882,774, one of ordinary skill will readily appreciate that a wide variety of materials can be used to form multilayer polymeric reflective mirror films when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material. Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

In many embodiments, the multilayer polymeric reflective mirror film alternating layers include PET/Ecdel, PEN/Ecdel, PEN/sPS, PEN/THV, PEN/co-PET, and PET/sPS, where "co-PET" refers to a copolymer or blend based upon terephthalic acid, Ecdel is a thermoplastic polyester commercially available from Eastman Chemical Co., and THV is a fluoropolymer commercially available from 3M Company, St. Paul, Minn.

The number of layers in the film is selected to achieve the desired optical properties using the minimum number of layers for reasons of film thickness, flexibility and economy. The number of layers can be less than 10,000, or less than 5,000, or less than 2,000. The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (or from 1:3 to 1:7) in the stretch direction and from 1:0.2 to 1:10 (or from 1:0.3 to 1:7) orthogonal to the stretch direction is preferred.

In some cases, useful encapsulants may be chosen based on properties such as refractive index and/or hardness. Thermal stability is also a potentially useful barometer, particularly as the encapsulant may be used to encapsulate one or more light sources that may generate significant heat when in use. An encapsulant may be used that has a refractive index that is close or substantially similar to a refractive index of a material to which the encapsulant is being applied. Fillers or other materials may be added to increase the refractive index, if necessary.

Another criteria is hardness. Hardness may be defined in terms of Shore durometer numbers. A material may have a Shore A number, a Shore D number or a Shore 00. While there is some overlap, Shore A numbers are frequently used to rate the hardness of hard rubbers, Shore D numbers are used to rate the hardness of soft rubbers and Shore 00 numbers are used to rate the hardness of foams.

In some instances, it may be desirable that the encapsulant be at least substantially transparent to light having particular wavelengths. For example, it may be desirable for the encapsulant to be at least substantially transparent to light having wavelengths within the visible light spectrum.

Encapsulants can include, but are not limited to silicone gums, gels, elastomers, and thermoplastics available from various suppliers, Dow Corning, NuSil, Nye, GE Silicones. Other encapsulants include, but are not limited to photocuring acrylates such as DYMAX4651™, photocuring epoxies, photocure silicone acrylates and silicone epoxies, caprolactones, and Ene-thiol materials.

As will be discussed subsequently, more than one encapsulant may be used. For example, it may be useful to use both a relatively hard encapsulant and a relatively soft encapsulant. In some instances, a relatively hard encapsulant may be used to encapsulate and protect a light source while a relatively soft encapsulant may be used to secure and optically couple the encapsulated light source to another optical element. Examples of suitable relatively hard (or high modulus) encapsulants include DOW SYLGARD 182™, which has a Shore hardness of A50. Examples of suitable relatively soft (or low modulus) encapsulants include DYMAX 4651™, which has a Shore hardness of D70, NORLAND ADHESIVES NOA81™, which has a Shore hardness of D90, and NYE OCK 451™, which has a Shore hardness of 00 35.

In another example of using multiple encapsulants, it may be desirable to use an encapsulant of one refractive index to match the index of the light source, and use an encapsulant of another refractive index of intermediate value to match the light source to the light input structure. In another example, multiple independent layers of encapsulants may be used to form an index gradient between the light source and the light input structure.

A backlight provides distribution of light from a light source over an area much larger than the light source, substantially over an entire emission or output surface area of the backlight. Light often enters the backlight along an edge surface and propagates between a back or reflective surface and the output surface from the edge surface toward an opposing end surface of the backlight by total internal reflection (TIR). In some embodiments, the backlight back surface includes structures, e.g., dots in a pattern. A light ray encountering one of these structures is redirected, i.e., diffusely reflected, in such a manner that it is caused to exit the output surface. In other embodiments, backlight light is extracted by frustration of the TIR. A ray confined within the backlight by TIR increases its angle of incidence relative to the plane of the output surface and reflective surface, due to the wedge angle, with each TIR bounce. The light eventually refracts out of the output surface at a glancing angle thereto, because it is no longer contained by TIR.

FIG. 1 provides an illustrative but non-limiting perspective schematic view of a backlight 10. The backlight 10 includes a visible light transmissive body 20 having a light guide portion 30 and a light input portion 40. The light transmissive body 20 can be formed of any useful light transmissive material such as, for example, glass, quartz, and/or a polymeric material. Useful polymeric material includes polyesters, polycarbonates, polyimides, polyacrylates, polymethylstyrenes, silicones such as GE's Invisisil liquid injection moldable material and the like.

The visible light transmissive body 20 may be formed via any useful method. In some instances, the visible light transmissive body 20 is formed via injection molding. In other cases, the visible light transmissive body 20 is formed via machining and optionally polishing of a solid slab of material. The light input portion 40 and the light guide portion 30 whether separate or combined pieces can be fabricated by injection molding, casting, extrusion or by machining solid materials or any other suitable process. The optical coupling material is of an appropriate index to index match the light input portion 40 to the light guide portion 30.

In many instances, the light transmissive body 20 is a solid body. In some embodiments, the light guide portion 30 and a light input portion 40 form a unitary or monolithic body. In other embodiments, the light guide portion 40 and a light input portion 40 are separate bodies having an interface surface 43, where the light guide portion 30 and a light input portion 40 are optically coupled together.

The light guide portion 30 includes a light reflection surface 32 and a light emission surface 34. In some instances, as illustrated, the light reflection surface 32 and the light emission surface 34 may be substantially parallel. In other cases, the light reflection surface 32 and the light emission surface 34 may be substantially non-parallel. One or more optical elements (not shown) may be disposed adjacent to the light emission surface 34. The light input portion 40 diverges from a narrow end 42. The light input portion 40 includes opposing side surfaces 44, 46 that are not parallel and extend between the narrow end 42 and the light guide portion 30. If the light input portion 40 is separately formed, it will have a wide end 48 corresponding to the location of interface surface 43.

In many instances, the width ratio of the narrow end 42 to the wide end 48 (regardless of whether the interface surface 43 is presence or absent) is around 1:2 or as low as 1:1.4 with n=1.5 index materials. In some cases, the narrow end has a width in a range from 1 to 20 mm. The length of the diverging wedge or light input portion 40 can assist in mixing light emitted from two or more light sources emitting light into the narrow end 42 of the light input portion 40. In some instances, this length can be in a range from 1 to 200 mm.

While not expressly shown in this Figure, the light input portion 40 may include one or more light sources that may be disposed on and/or within the narrow end 42, and one or both of the opposing side surfaces 44, 46. The light sources are shown in subsequent Figures. The light input portion 40 may be at least partially covered with a specularly reflective film or layer that is disposed about the light input portion 40 but is not in intimate contact with the light input portion 40. In some cases, the specularly reflective film or layer may reflect at least about 80 percent of the light incident thereon.

In some instances, such as if the light source is positioned within one or both of the opposing side surfaces 44 and 46, the specularly reflective film or layer may be a multilayer polymeric mirror film that reflects at least about 95 percent of light incident on the film. In some instances, the multilayer polymeric mirror film may reflect at least about 98 percent of all incident light, regardless of incident angle. In many cases, the multilayer polymeric mirror film is Vikuiti™ ESR film, which is available from 3M Company, St. Paul, Minn.

As noted above, FIG. 1 is a schematic view of an illustrative but non-limiting backlight 10 that includes the light guide portion 30 and the light input portion 40. As discussed, the light input portion 40 may be integrally or monolithically formed with the light guide portion 30 utilizing injection molding or any suitable process. In some instances, the light input portion 40 may be separately formed and then subsequently secured to the light input portion 30 using any suitable adhesive or other material.

Figure 2:
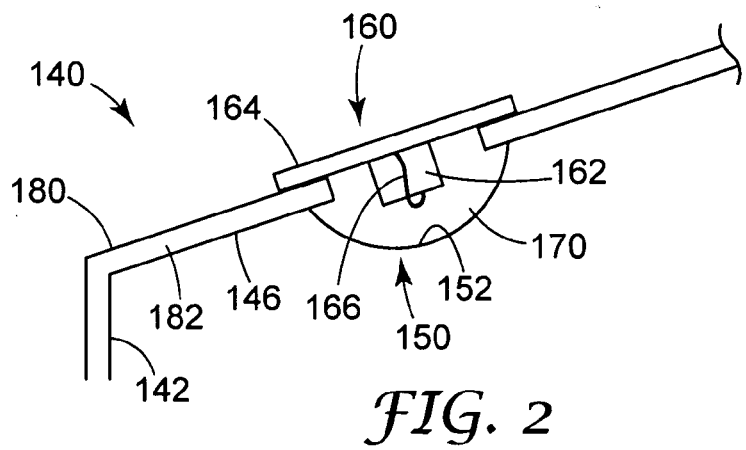
FIG. 2 is a partial section taken along line 2-2 of FIG. 1.

FIG. 2 shows a part or corner of a light input portion 140 that includes a narrow end 142 and a side surface 146. While only a portion of the side surface 146 is illustrated, it will be appreciated that the side surface 146 will extend to a light guide (not shown in this Figure). A light source well 150 having a light source well surface 152 is formed within the side surface 146 and extends into the light input portion 130. The light source well 150 may be molded into the light input portion 130 when the light input portion 140 is formed, or may be created subsequently.

A light source 160 extends into the light source well 150. While a single light source 160 is illustrated, it will be appreciated that an array of light sources 160 may be employed. In some cases, two or more parallel rows of light sources 160 may be used. In some instances, as illustrated, the light source 160 may include a wire bonded LED 162 that is secured to a substrate 164. It will be appreciated that the substrate 164 may include a heat sink and/or circuitry to power the LED 162. A heat sink may be sized and configured to provide adequate cooling of the LED 162. A wire bond 166 extends from the LED 162 to the substrate 164. In some instances, the wire bond 166 may be oriented along a direction parallel or at least substantially parallel to the light source well 150. An encapsulant 170 fills the space between the light source 160 and the light source well surface 152. The encapsulant 170 may be provided in sufficient volume to at least encapsulate and thus protect the wire bond 166 that extends between the LED 162 and the substrate 164. In some instances, as illustrated, a single encapsulant may be used.

In other cases, as will be discussed with respect to FIG. 3, the encapsulant 170 may include two or more different encapsulant materials that may be applied in distinct layers. In some cases, the encapsulant 170 may be applied to the light source 160 prior to insertion of the light source 160 into the light source well 150. In other instances, the encapsulant 170 may be filled into the light source well 150, and the light source 160 may then be inserted into the light source well 150 and hence into the encapsulant 170.

A specularly reflective film or layer 180 is disposed about at least a portion of the light source portion 140 such that an air gap 182 exists between the specularly reflective film or layer 180 and at least one of the side surface 146 and the narrow end 142. The specularly reflective film or layer 180 may be considered as not being in intimate contact with the light source portion 130. The specularly reflective film or layer 180 may be considered as covering at least the side surface 146 and the opposing side surface (not seen in this Figure). In some cases, as illustrated, the specularly reflective film or layer 180 may also cover at least a portion of the narrow end 142. As noted above, the specularly reflective film or layer 180 may be selected to reflect a large fraction of light incident thereon.

Figure 3:
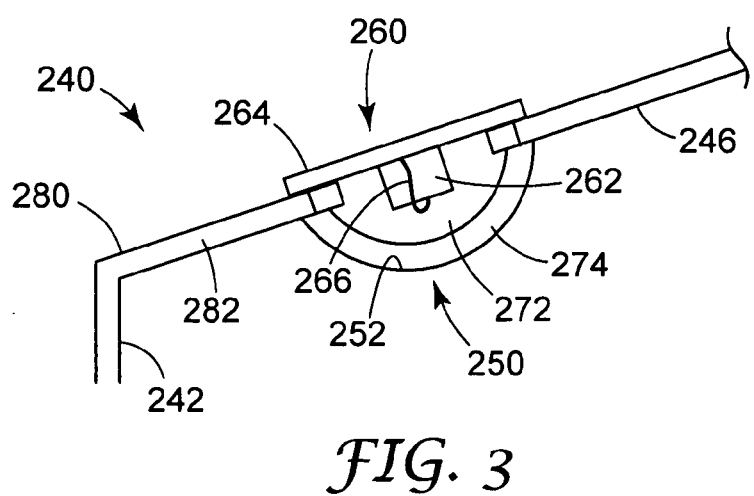
FIG. 3 is a diagrammatic illustration of the partial section of FIG. 2.

FIG. 3 illustrates a part or corner of a light input portion 240 that includes a narrow end 242 and a side surface 246. While only a portion of the side surface 246 is illustrated, it will be appreciated that the side surface 246 will extend to a light guide (not shown in this Figure). A light source well 250 having a light source well surface 252 is formed within the side surface 246 and extends into the light input portion 240. The light source well 250 may be molded into the light input portion 240 when the light input portion 240 is formed, or may be created subsequently.

A light source 260 extends into the light source well 250. In some instances, as illustrated, the light source 260 may include a wire bonded LED 262 that is secured to a substrate 264. It will be appreciated that the substrate 264 may include a heat sink and/or circuitry to power the LED 262. A heat sink may be sized and configured to provide adequate cooling of the LED 262. A wire bond 266 extends from the LED 262 to the substrate 264. In some instances, the wire bond 266 may be oriented along a direction parallel or at least substantially parallel to the light source well 250.

In this Figure, the encapsulant includes a primary encapsulant 272 and a secondary encapsulant 274. The primary encapsulant 272 envelopes at least a portion of the light source 260 while the secondary encapsulant 274 envelopes the primary encapsulant 272 and contacts the light source well surface 252. The primary encapsulant 272 can be seen as encapsulating, and thus protecting, the wire bond 266. In some instances, the primary encapsulant 272 and the secondary encapsulant 274 may be considered as optically coupling the light source 260 to the light input portion 240.

In some cases, the primary encapsulant 272 may be a material having a relatively low hardness modulus while the secondary encapsulant 274 may be a material having a relatively high hardness modulus. In particular instances, the primary encapsulant 272 may be a relatively hard encapsulant to protect the light source 260 (and in particular the wire bond 266) while the secondary encapsulant 274 may be a relatively soft encapsulant to conform to the dimensions and shape of the light source well 250 as well as to optically couple the light source 260 to the light input portion 240.

In some cases, the primary encapsulant 272 and the secondary encapsulant 274 may be successively applied onto and over the light source 260 prior to insertion of the light source 260 into the light source well 250. In some cases, the primary encapsulant 272 may be applied onto the light source 260 while the secondary encapsulant 274 may be applied into the light source well 250, and the primary encapsulated light source 260 may then be inserted into the light source well 250 and hence into the secondary encapsulant 274. While not illustrated, the encapsulant 270 may include multiple layers, as discussed above.

A specularly reflective film or layer 280 is disposed about at least a portion of the light source portion 240 but is not in intimate contact with the light source portion 240. An air gap 282 exists between the light source portion 240 and the specularly reflective film or layer 280.

Figure 4:
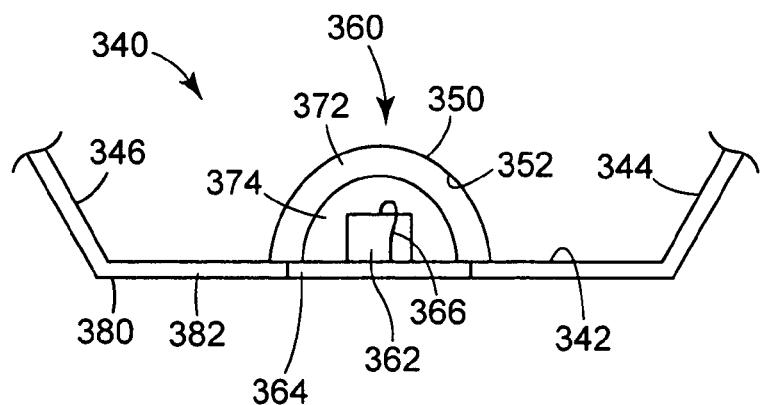
FIG. 4 is a partial section taken along line 4-4 of FIG. 1.

FIG. 4 illustrates an end of a light input portion 340 that includes a narrow end 342 and opposing side surfaces 344 and 346. Unlike FIGS. 2 and 3, FIG. 4 shows an end-mounted encapsulated light source. It will be appreciated that the side surfaces 344 and 346 will extend to a light guide (not shown in this Figure). A light source well 350 having a light source well surface 352 is formed within the narrow end 342 and extends into the light input portion 340. The light source well 350 may be molded into the light input portion 340 when the light input portion 340 is formed, or may be created subsequently.

A light source 360 extends into the light source well 350. In some instances, as illustrated, the light source 360 may include a wire bonded LED 362 that is secured to a substrate 364. It will be appreciated that the substrate 364 may include a heat sink and/or circuitry to power the LED 362. A heat sink may be sized and configured to provide adequate cooling of the LED 362. A wire bond 366 extends from the LED 262 to the substrate 364. In some instances, the wire bond 366 may be oriented along a direction parallel or at least substantially parallel to the light source well 350.

In this Figure, the encapsulant includes a primary encapsulant 372 and a secondary encapsulant 374. The primary encapsulant 372 envelopes at least a portion of the light source 360 (and thus protects the wire bond 366) while the secondary encapsulant 374 envelopes the primary encapsulant 372 and contacts the light source well surface 352. In some instances, the primary encapsulant 372 and the secondary encapsulant 374 may be considered as optically coupling the light source 360 to the light input portion 340. While not expressly illustrated, it is considered that a single encapsulant could be used, as discussed with respect to FIG. 2. In some instances, multiple encapsulant layers may be used.

In some cases, the primary encapsulant 372 may be a material having a relatively low hardness modulus while the secondary encapsulant 374 may be a material having a relatively high hardness modulus. In particular instances, the primary encapsulant 372 may be a relatively hard encapsulant to protect the light source 360 (and in particular the wire bond 366) while the secondary encapsulant 374 may be a relatively soft encapsulant to conform to the dimensions and shape of the light source well 350 as well as to optically couple the light source 360 to the light input portion 340.

In some cases, the primary encapsulant 372 and the secondary encapsulant 374 may be successively applied onto and over the light source 360 prior to insertion of the light source 360 into the light source well 350. In some cases, the primary encapsulant 372 may be applied onto the light source 360 while the secondary encapsulant 374 may be applied into the light source well 350, and the primary encapsulated light source 360 may then be inserted into the light source well 350 and hence into the secondary encapsulant 374.

A specularly reflective film or layer 380 is disposed about at least a portion of the light source portion 330 but is not in intimate contact with the light source portion 340. An air gap 382 exists between the light source portion 340 and the specularly reflective film or layer 380. The specularly reflective film or layer 380 may be considered as covering at least the side surface 346 and the opposing side surface 344. In some cases, as illustrated, the specularly reflective film or layer 380 may also cover at least a portion of the narrow end 342. As noted above, the specularly reflective film or layer 380 may be selected to reflect a large fraction of light incident thereon.

Figure 5:
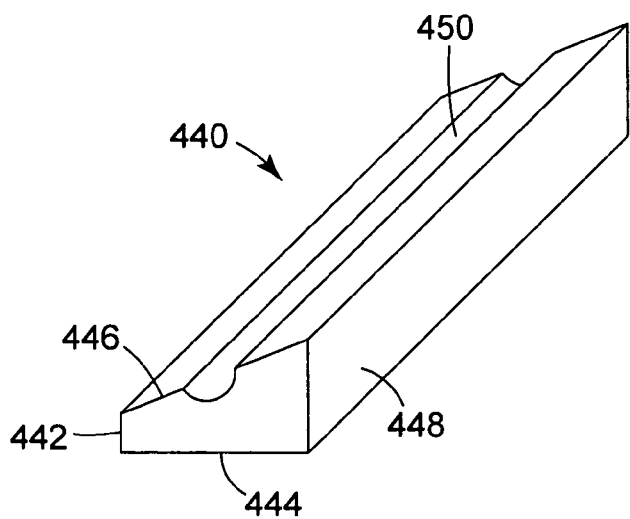
FIG. 5 is a diagrammatic perspective view of an illustrative but non-limiting diverging wedge as described herein.
Figure 6:
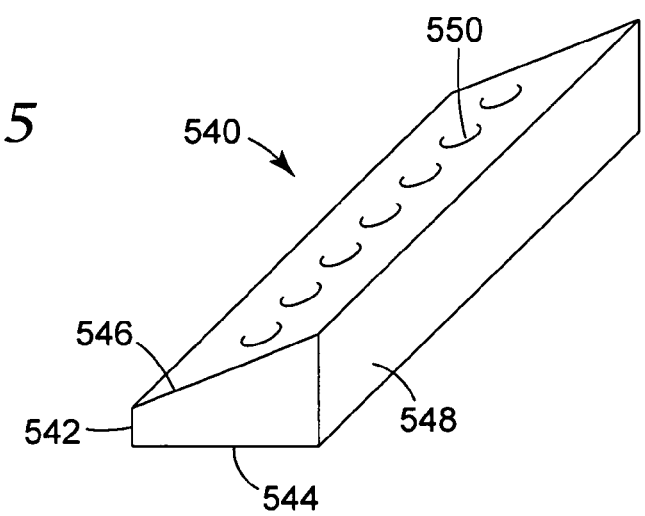
FIG. 6 is a diagrammatic perspective view of an illustrative but non-limiting diverging wedge as described herein.

FIGS. 5 and 6 are schematic perspective illustrations of diverging wedges. In some instances, the diverging wedges shown in FIGS. 5 and 6 may be considered as representing the light input portion 40 of the light transmissive body 20 (FIG. 1). In some cases, these diverging wedges may represent distinct structures that are independently formed and then subsequently attached to a light guide (such as light guide portion 30 of FIG. 1).

FIG. 5 illustrates a diverging wedge 440 having, in cross-section, a narrow end 442 and a wide end 448. Opposing side surfaces 444 and 446 extend between the narrow end 442 and the wide end 448. It can be seen that the opposing side surfaces 444 and 446 are not parallel. The side surface 446 includes a channel 450 that provides a well that is configured to accommodate whichever light source(s) is(are) disposed within the channel 450. The channel 450 may be molded into the diverging wedge 440, or may alternatively be subsequently provided by, for example, grinding or milling.

In some instances, the channel 450 may be configured to accommodate a plurality of light sources such as wire bonded LEDs. The channel 450 may, in particular, be wide enough and deep enough to accommodate each LED and each associated wire bond without physically contacting either. In some cases, the channel 450 may be configured such that circuitry may extend beyond the borders of the channel 450 so that each wire bond may make electrical contact with the circuitry while remaining safely within the channel 450 (and hence the encapsulant therein).

In some instances, the channel 450 may be sized to accommodate a linear array of wire bonded LEDs arranged single file. In some cases, the channel 450 may be sized to accommodate two or more linear arrays of wire bonded LEDs. The LEDs within a single linear array may be arranged single file, and each linear array may be at least substantially parallel with the other one or more linear arrays and with the channel 450 itself. As discussed above, each of the wire bonded LEDs may be oriented such that their respective wire bonds are parallel to each other and/or to the channel 450.

In some cases, the plurality of wire bonded LEDs within a linear array may be arranged such that the wire bonds for each LED are parallel with each other and with a long axis of the channel 450 such that the wire bonds fit within the channel 450 and the encapsulation provided therein. As a result, the wire bonds are protected by the encapsulant provided within the channel 450. Moreover, this arrangement may require less space, thereby permitting further reductions in package sizing. In particular, optical elements such as the sides of the wedge 440 may be brought even closer, permitting smaller and more compact designs and more efficient light collection.

FIG. 6 illustrates a diverging wedge 540 having, in cross-section, a narrow end 542 and a wide end 548. Opposing side surfaces 544 and 546 extend between the narrow end 542 and the wide end 548. It can be seen that the opposing side surfaces 544 and 546 are not parallel. The side surface 546 includes a number of individual wells 550 that are each configured to accommodate a light source. The wells 460 may be molded into the diverging wedge 540, or may alternatively be subsequently provided by, for example, drilling.

Figure 7:
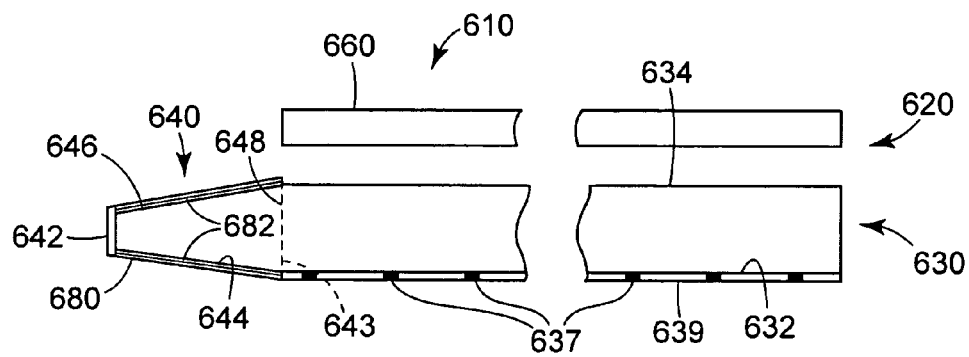
FIG. 7 is a diagrammatic perspective view of an illustrative but non-limiting backlight as described herein.

FIG. 7 is a schematic cross-sectional view of a backlight 610. The backlight 610 includes a visible light transmissive body 620 that has a light guide portion 630 and a light input portion 640. The visible light transmissive body 620 may be formed of any useful light transmissive material as described above. In some instances, the light guide portion 630 and the light input portion 640 form a unitary or monolithic body. In other cases, the light guide portion 630 and the light input portion 640 are separate bodies having an interface surface 643, where the light, guide portion 630 and the light input portion 640 are optically coupled together.

The light guide portion 630 includes a light reflection surface 632 and a light output or emission surface 634. In the illustrated embodiment, the light reflection surface 632 and the emission surface 634 are substantially parallel. In many embodiments, the light reflection surface 632 includes a specular or diffuse reflective layer 639 and a plurality of light extraction elements 637. The light extraction elements 637 can be arranged in any useful random or non-random or pseudo-random pattern, as desired, to provide uniform extraction of light from the backlight. In some embodiments, the plurality of light extraction elements 637 are a pattern of dots from 0.1 to 10 mm in diameter.

One or more optical elements 660 can be disposed adjacent to the emission surface 634. In some embodiments, the optical element 660 includes a liquid crystal display. In other embodiments, the optical element 660 includes a liquid crystal display and one or more optical films disposed between the liquid crystal display and the emission surface 634. In a further embodiment, the optical element 660 may be a graphic film or other optical film. In a further embodiment, the optical element 660 may not be needed, if for example the emission surface 634 is used as a light source or luminaire.

The light input portion 640 diverges from a narrow end 642. In many embodiments, the light input portion 640 is a diverging wedge. The light input portion 640 includes opposing side surfaces 644, 646 that are not parallel and extend between the narrow end 642 and the light guide portion 630. In some embodiments, the light input portion 640 includes opposing side surfaces 644, 646 that are not parallel and extend between the narrow end 642 and a wide end 648 adjacent to the interface surface 643. In many embodiments, the width ratio of the narrow end 642 to the wide end 648 (regardless of whether the interface surface 643 is presence or absent) is around 1:2 or as low as 1:1.4 with n=1.5 index materials. Illustrative dimensions of the light input portion 640 are described above.

As discussed above and as shown for example in FIGS. 2, 3 and 4, one or more light source may be disposed in or near the narrow end 642, and/or the opposing side surfaces 644 and 646. The light sources may be encapsulated, as discussed above. For clarity, and because the encapsulated light sources may be mounted in a variety of positions relative to the light input portion 640, the light sources are not illustrated in FIGS. 7, 8, 9 and 10. In some instances, the light sources may be one or more light emitting diodes. In some cases, a linear array of LEDS, emitting at least red, blue and green light, may be used.

A specularly reflective film or layer 680 is disposed adjacent to the opposing side surfaces 644, 646 but is not in intimate contact with the opposing side surfaces 644, 646. An air gap 682 exists between the opposing side surfaces 644, 646 and the specularly reflective film or layer 680.

The specularly reflective film or layer 680 is described above and reflects more than 80% of visible light (emitted light) incident on the specularly reflective film or layer 680. In some embodiments, the specularly reflective film or layer 680 may, as described above, be a multilayer polymeric mirror film that reflects more than 95% or even more than 98% of visible light (emitted light) incident at all angles on the multilayer polymeric mirror film 680. Specularly reflective film or layer 680 or any other useful reflective layer can be disposed along the narrow end 642 to assist in reflecting light emitted by the light source toward the light guide portion 630. In many embodiments, the multilayer polymeric mirror film is Vikuiti™ ESR film, which is available from 3M Company, St. Paul, Minn.

Figure 8:
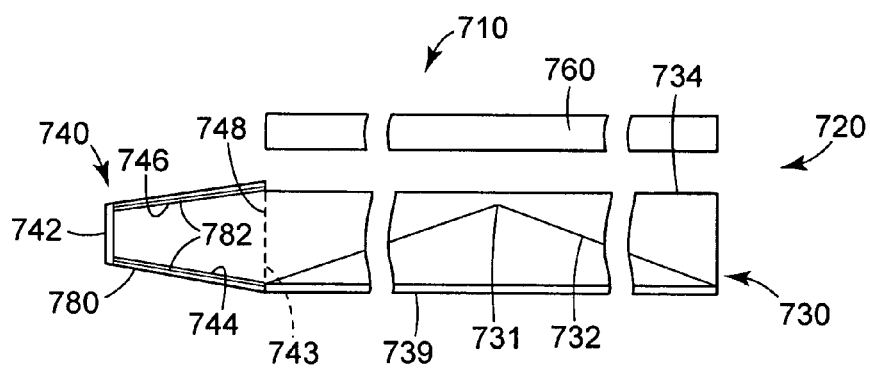
FIG. 8 is a diagrammatic perspective view of an illustrative but non-limiting backlight as described herein.

FIG. 8 is a schematic cross-sectional view of a backlight 710. The backlight 710 includes a visible light transmissive body 720 that has a light guide portion 730 and a light input portion 740. The visible light transmissive body 720 may be formed of any useful light transmissive material as described above. In some instances, the light guide portion 730 and the light input portion 740 form a unitary or monolithic body. In other cases, the light guide portion 730 and the light input portion 740 are separate bodies having an interface surface 743, where the light guide portion 730 and the light input portion 740 are optically coupled together.

The light guide portion 730 includes a light reflection surface 732 and a light output or emission surface 734. In the illustrated embodiment, the light reflection surface 732 and the emission surface 734 are substantially non-parallel, as the light reflection surface 732 includes an inflection point 731. In many embodiments, a specular or diffuse reflective layer 739 is disposed beneath the light reflection surface 732.

One or more optical elements 760 can be disposed adjacent to the emission surface 734. In some embodiments, the optical element 760 includes a liquid crystal display. In other embodiments, the optical element 760 includes a liquid crystal display and one or more optical films disposed between the liquid crystal display and the emission surface 734. In a further embodiment, the optical element 760 may be a graphic film or other optical film. In a further embodiment, the optical element 760 may not be needed, if for example the emission surface 734 is used as a light source or luminaire.

The light input portion 740 diverges from a narrow end 742. In many embodiments, the light input portion 740 is a diverging wedge. The light input portion 740 includes opposing side surfaces 744, 746 that are not parallel and extend between the narrow end 742 and the light guide portion 730. In some embodiments, the light input portion 740 includes opposing side surfaces 744, 746 that are not parallel and extend between the narrow end 742 and a wide end 748 adjacent to the interface surface 743. In many embodiments, the width ratio of the narrow end 742 to the wide end 748 (regardless of whether the interface surface 743 is presence or absent) is around 1:2 or as low as 1:1.4 with n=1.5 index materials. Illustrative dimensions of the light input portion 740 are described above.

As discussed above and as shown for example in FIGS. 2, 3 and 4, one or more light source may be disposed in or near the narrow end 742, and/or the opposing side surfaces 744 and 746. The light sources may be encapsulated, as discussed above. For clarity, and because the encapsulated light sources may be mounted in a variety of positions relative to the light input portion 740, the light sources are not shown.

A specularly reflective film or layer 780 is disposed adjacent to the opposing side surfaces 744, 746 but is not in intimate contact with the opposing side surfaces 744, 746. An air gap 782 exists between the opposing side surfaces 744, 746 and the specularly reflective film or layer 780.

The specularly reflective film or layer 780 is described above and reflects more than 80% of visible light (emitted light) incident on the multilayer polymeric mirror film 780. In some embodiments, the specularly reflective film or layer 780 may be a multilayer polymeric mirror film that reflects more than 95% or even more than 98% of visible light (emitted light) incident at all angles thereon. Specularly reflective film or layer 780 or any other useful reflective layer can be disposed along the narrow end 742 to assist in reflecting light emitted by the light source toward the light guide portion 730.

Figure 9:
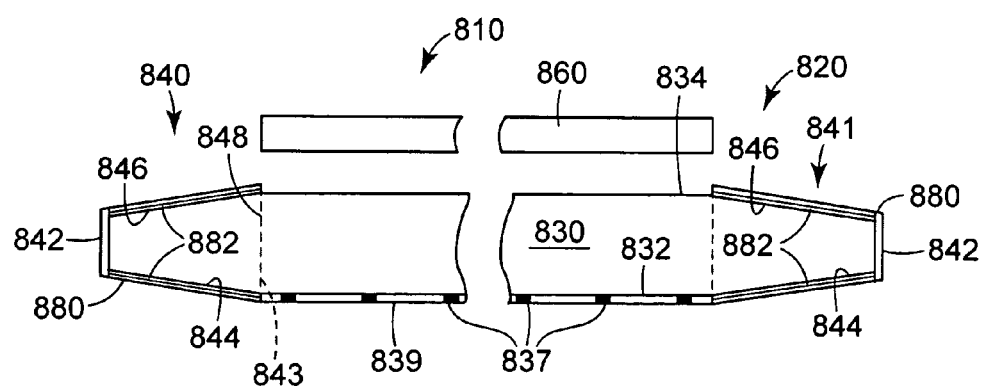
FIG. 9 is a diagrammatic perspective view of an illustrative but non-limiting backlight as described herein.

FIG. 9 is a schematic cross-sectional view of a backlight 810. The backlight 810 includes a visible light transmissive body 820 that has a light guide portion 830, a first light input portion 840 and a second light input portion 841. The first light input portion 840 and the second light input portion 841 may be the same or different. For illustration purposes, the first and second light input portions 840, 841 are described similarly, but this is not required.

The visible light transmissive body 820 may be formed of any useful light transmissive material as described above. In some instances, the light guide portion 830 and the light input portions 840, 841 form a unitary or monolithic body. In other cases, the light guide portion 830 and the light input portions 840, 841 are separate bodies having interfaces surface 843, where the light guide portion 830 is optically coupled to the light input portions 840, 841.

The light guide portion 830 includes a light reflection surface 832 and a light output or emission surface 834. In the illustrated embodiment, the light reflection surface 832 and the emission surface 834 are substantially parallel. In many embodiments, the light reflection surface 832 includes a specular or diffuse reflective layer 839 and a plurality of light extraction elements 837. The light extraction elements 837 can be arranged in any useful random or non-random or pseudo-random pattern, as desired, to provide uniform extraction of light from the backlight. In some embodiments, the plurality of light extraction elements 837 are a pattern of dots from 0.1 to 10 mm in diameter.

One or more optical elements 860 can be disposed adjacent to the emission surface 834. In some embodiments, the optical element 860 includes a liquid crystal display. In other embodiments, the optical element 860 includes a liquid crystal display and one or more optical films disposed between the liquid crystal display and the emission surface 834. In a further embodiment, the optical element 860 may be a graphic film or other optical film. In a further embodiment, the optical element 860 may not be needed, if for example the emission surface 834 is used as a light source or luminaire.

As illustrated, each of the light input portions 840, 841 diverges from a narrow end 842. In many embodiments, they are diverging wedges. Each light input portion 840, 841 include opposing side surfaces 844, 846 that are not parallel and extend between the narrow end 842 and the light guide portion 830. In some embodiments, each light input portion 840, 841 include opposing side surfaces 844, 846 that are not parallel and extend between the narrow end 842 and a wide end 848 adjacent to the interface surface 843. In many embodiments, the width ratio of the narrow end 842 to the wide end 848 (regardless of whether the interface surface 843 is presence or absent) is around 1:2 or as low as 1:1.4 with n=1.5 index materials. Illustrative dimensions of each light input portion 840,841 are described above.

As discussed above and as shown for example in FIGS. 2, 3 and 4, one or more light source may be disposed in or near the narrow end 842, and/or the opposing side surfaces 844 and 846. The light sources may be encapsulated, as discussed above. For clarity, and because the encapsulated light sources may be mounted in a variety of positions relative to the light input portion 840, the light sources are not illustrated in FIGS. 7, 8, 9 and 10.

A specularly reflective film or layer 880 is disposed adjacent to the opposing side surfaces 844, 846 but is not in intimate contact with the opposing side surfaces 844, 846. An air gap 882 exists between the opposing side surfaces 844, 846 and the specularly reflective film or layer 880. The specularly reflective film or layer 880 is described above and reflects more than 80% of visible light (emitted light) incident on the multilayer polymeric mirror film 880, or in some cases more than 95% or even more than 98%. Specularly reflective film 880 or any other useful reflective layer can be disposed along the narrow end 842 to assist in reflecting light emitted by the light source toward the light guide portion 830.

Figure 10:
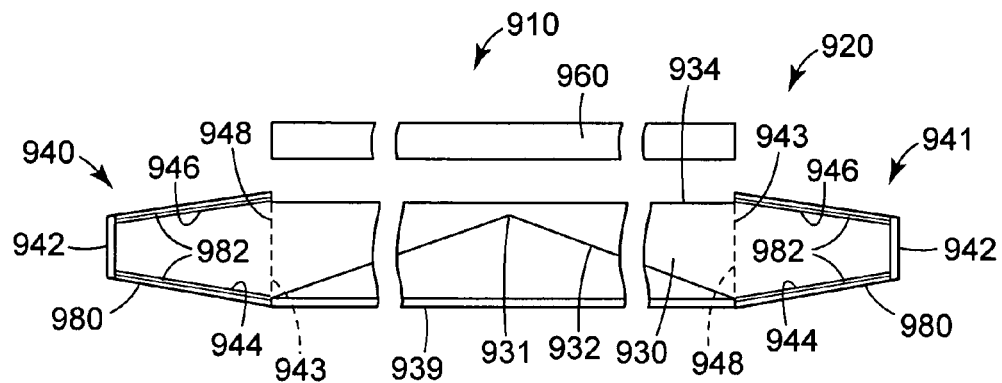
FIG. 10 is a diagrammatic perspective view of an illustrative but non-limiting backlight as described herein.

FIG. 10 is a schematic cross-sectional view of a backlight 910. The backlight 910 includes a visible light transmissive body 920 that has a light guide portion 930, a first light input portion 940 and a second light input portion 941. The first light input portion 940 and the second light input portion 941 may be the same or different. For illustration purposes, the first and second light input portions 940, 941 are described similarly, but this is not required.

The visible light transmissive body 920 may be formed of any useful light transmissive material as described above. In some instances, the light guide portion 930 and each light input portion 940, 941 form a unitary or monolithic body. In other cases, the light guide portion 930 and the light input portions 940, 941 are separate bodies having an interface surface 943, where the light guide portion 930 and each light input portion 940, 941 are optically coupled together.

The light guide portion 930 includes a light reflection surface 932 and a light output or emission surface 934. In the illustrated embodiment, the light reflection surface 932 and the emission surface 934 are substantially non-parallel, as the light reflection surface 932 includes an inflection point 931. In many embodiments, a specular or diffuse reflective layer 939 is disposed beneath the light reflection surface 932.

One or more optical elements 960 can be disposed adjacent to the emission surface 934. In some embodiments, the optical element 960 includes a liquid crystal display. In other embodiments, the optical element 960 includes a liquid crystal display and one or more optical films disposed between the liquid crystal display and the emission surface 934. In a further embodiment, the optical element 960 may be a graphic film or other optical film. In a further embodiment, the optical element 960 may not be needed, if for example the emission surface 934 is used as a light source or luminaire.

Each light input portion 940, 941 diverges from a narrow end 942. Each light input portion 940, 941 include opposing side surfaces 944, 946 that are not parallel and extend between the narrow end 942 and the light guide portion 930. In some embodiments, each light input portion 940, 941 include opposing side surfaces 944, 946 that are not parallel and extend between the narrow end 942 and a wide end 948 adjacent to the interface surface 943. In many embodiments, the width ratio of the narrow end 942 to the wide end 948 (regardless of whether the interface surface 943 is presence or absent) is around 1:2. Illustrative dimensions of the light input portion 940 are described above.

As discussed above and as shown for example in FIGS. 2, 3 and 4, one or more light source may be disposed in or near the narrow end 942, and/or the opposing side surfaces 944 and 946. The light sources may be encapsulated, as discussed above. For clarity, and because the encapsulated light sources may be mounted in a variety of positions relative to each light input portion 940, 941, the light sources are not shown.

A specularly reflective film or layer 980 is disposed adjacent to the opposing side surfaces 944, 946 but is not in intimate contact with the opposing side surfaces 944, 946. An air gap 982 exists between the opposing side surfaces 944, 946 and the specularly reflective film or layer 980. The specularly reflective film or layer 980 is described above and reflects more than 80% of visible light (emitted light) incident on the multilayer polymeric mirror film 980. In some embodiments, the specularly reflective film or layer 980 reflects more than 95% or even more than 98% of visible light (emitted light) incident at all angles on the specularly reflective film or layer 980. specularly reflective film or layer 980 or any other useful reflective layer can be disposed along the narrow end 942 to assist in reflecting light emitted by the light source toward the light guide portion 930.

Figure 11:
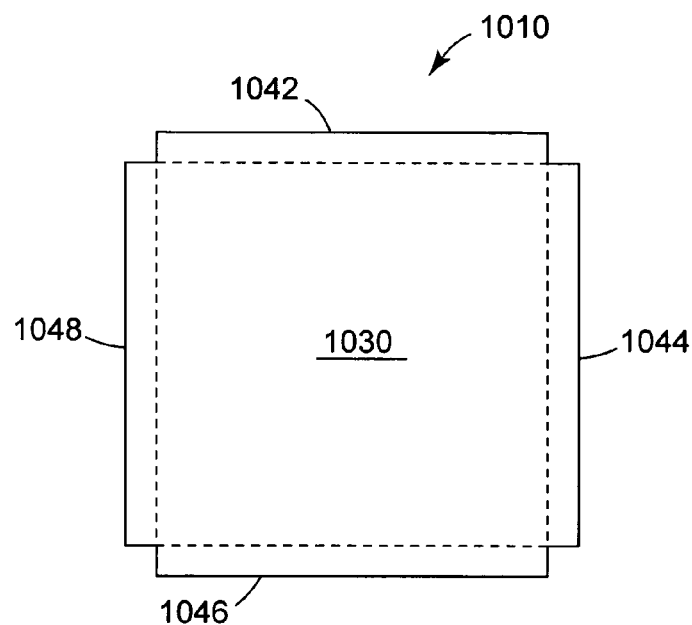
FIG. 11 is a diagrammatic top view of an illustrative but non-limiting backlight as described herein.

In the illustrations discussed thus far, the backlights described herein included either one or two light input portions. In some cases, it is contemplated that three or even four light input portions could be employed. FIG. 11 is a schematic top view of a backlight 1010 that includes a light guide portion 1030. The top of the backlight 1010, as seen, is the light emission surface. The backlight 1010 also includes a first light input portion 1042, a second light input portion 1044, a third light input portion 1046 and a fourth light input portion 1048. Each light input portion 1042, 1044, 1046 and 1048 may be integrally molded or otherwise formed with the light guide portion 1030. In other instances, one or more of the light input portions 1042, 1044, 1046 and 1048 may be formed separately and then subsequently attached to the light guide portion 1030.

Each of the light input portions 1042, 1044, 1046 and 1048 may include one or more encapsulated light sources, including light sources 160, 260 and 360 as previously discussed. The light sources may be end-mounted, as seen for example in FIG. 4, or side-mounted as illustrated in FIGS. 2 and 3. Each light input portion 1042, 1044, 1046 and 1048 may include a single light source or a plurality of light sources.

The illustrated backlight 1010 is shown generally having a square shape, however the backlight can have any polygonal shape and including one or more light input portions (including the light sources) adjacent to one or more of the polygonal sides. In some embodiments, the backlight 1010 has a rectangular shape with either a 4 to 3 aspect ratio or a 16 to 9 aspect ratio; often useful in television or monitor application. In some instances, the backlight 1010 is used in conjunction with a commercial graphics display, or a sign.

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

We claim:

1. A backlight comprising:
   a visible light transmissive body primarily propagating light by TIR having a light guide portion and a light input portion, the light guide portion having a light reflection surface and a light emission surface, and the light input portion having opposing side surfaces that are not parallel;
   a light source well formed in one of the light input portion surfaces, the light source well including a light source well surface;
   a light source extending into the light source well, the light source emitting light into the light input portion;
   an encapsulant disposed between the light source and the light source well surface; and
   a specularly reflective film or layer disposed adjacent to the opposing side surfaces, reflecting more than 80% of light, that is emitted from the light source and escapes through the opposing side surfaces, back into the visible light transmissive body.

2. A backlight according to claim 1 wherein the light source comprises a plurality of wire bonded light emitting diodes.

3. A backlight according to claim 1 wherein the encapsulant comprises a primary encapsulant covering the light source and a secondary encapsulant disposed between the primary encapsulant and the light source well surface.

4. A backlight according to claim 3 wherein the primary encapsulant comprises a high modulus material.

5. A backlight according to claim 3 wherein the secondary encapsulant comprises a low modulus material.

6. A backlight according to claim 1 wherein the encapsulant optically couples the light source to the light input portion.

7. A backlight according to claim 1 wherein the light input portion comprises a narrow end surface, the light source well formed in the narrow end surface.

8. A backlight according to claim 1 wherein the light source well is formed in one of the opposing side surfaces.

9. A backlight according to claim 8 wherein the specularly reflective film or layer comprises multilayer polymeric mirror film reflecting more than 95% of visible light incident on the multilayer polymeric mirror film.

10. A backlight according to claim 9 wherein the multilayer polymeric mirror film reflects more than 98% of visible light incident on the multilayer polymeric mirror film.

11. A backlight according claim 1 wherein the light emission surface and the light reflection surface are parallel, and the light reflection surface comprises a plurality of light extraction elements.

12. A backlight according to claim 1 wherein the light emission surface and the light reflection surface are non-parallel.

13. A backlight according to claim 1 further comprising a liquid crystal display panel disposed adjacent to the light emission surface.

14. A backlight according to claim 1, wherein the light source well comprises a channel.

15. A backlight according to claim 1, wherein the light source well comprises a plurality of individual depressions.

16. A backlight comprising:
   a diverging wedge primarily propagating light by TIR and defined by a narrow end surface and a wide end surface, and opposing side surfaces that are not parallel and extend between the narrow end and the wide end;

a light source well formed in one of the wedge surfaces, the light source well including a light source well surface;

a light source extending into the light source well, the light source emitting light into the diverging wedge;

an encapsulant disposed between the light source and the light source well surface;

a light guide optically coupled to the wide end surface, the light guide having a light reflection surface and a light emission surface; and a specularly reflective film or layer disposed adjacent to the opposing side surfaces, reflecting more than 80% of light, that is emitted from the light source and escapes through the opposing side surfaces, back into the visible light transmissive body.

17. A backlight according to claim 16 wherein the light emission surface and the light reflection surface are parallel, and the light reflection surface comprises a plurality of light extraction elements.

18. A backlight according to claim 16 wherein the light emission surface and the light reflection surface are non-parallel.

19. A backlight comprising:

a first diverging wedge primarily propagating light by TIR and defined by a first narrow end surface and a first wide end surface, and first non-parallel opposing side surfaces that extend between the first narrow end and the first wide end;

a first light source well formed in one of the first diverging wedge surfaces, the first light source well including a first light source well surface;

a first light source extending into the first light source well, the first light source emitting light into the first diverging wedge;

a first encapsulant disposed between the first light source and the first light source well surface;

a second diverging wedge defined by a second narrow end surface and a second wide end surface, and second non-parallel opposing side surfaces that extend between die second narrow end and the second wide end;

a second light source well formed in one of the second diverging wedge surfaces, the second light source well including a second light source well surface;

a second light source extending into the second light source well, the second light source emitting light into the second diverging wedge;

a second encapsulant disposed between the second light source and the second light source well surface;

at light guide optically coupled to the first wide end surface and the second wide end surface, the light guide having a light reflection surface and a light extraction surface; and a specularly reflective film or layer disposed adjacent to the opposing side surfaces, reflecting more than 80% of light, that is emitted from the light source and escapes through the opposing side surfaces, back into the visible light transmissive body.

20. A backlight according to claim 19 wherein the light emission surface and the light reflection surface are parallel, and the light reflective surface comprises a plurality of light extraction elements.

21. A backlight according to claim 19 wherein the light emission surface and the light reflection surface are non-parallel.

22. A backlight assembly according to claim 19 wherein the first encapsulant optically couples the first light source to the first diverging wedge.

23. A backlight assembly according to claim 19 wherein the second encapsulant optically couples the second light source to the second diverging wedge.

24. A backlight assembly according to claim 19 further comprising a third diverging wedge defined by a third narrow end surface and a third wide end surface, and third opposing side surfaces that are not parallel and extend between the third narrow end and the third wide end; a third light source well formed in one of the third diverging wedge surfaces, the third light source well including a third light source well surface; a third light source extending into the third light source well, the third light source emitting light into the third diverging wedge; and a third encapsulant disposed between the third light source and the third light source well surface; wherein the third wide end surface is optically coupled to the light guide.

* * * * *